United States Patent
Dong et al.

(10) Patent No.: US 10,782,999 B2
(45) Date of Patent: Sep. 22, 2020

(54) METHOD, DEVICE, AND SINGLE-TASKING SYSTEM FOR IMPLEMENTING MULTI-TASKING IN SINGLE-TASKING SYSTEM

(71) Applicant: PAX COMPUTER TECHNOLOGY (SHENZHEN) CO., LTD., Shenzhen, Guangdong (CN)

(72) Inventors: Shifang Dong, Guangdong (CN); Yingfeng Tang, Guangdong (CN)

(73) Assignee: PAX COMPUTER TECHNOLOGY (SHENZHEN) CO., LTD., Shenzhen, Guangdong (CN)

(*) Notice: Subject to any disclaimer, the term of this patent is extended or adjusted under 35 U.S.C. 154(b) by 374 days.

(21) Appl. No.: 15/839,127

(22) Filed: Dec. 12, 2017

(65) Prior Publication Data
US 2018/0101402 A1 Apr. 12, 2018

Related U.S. Application Data

(63) Continuation-in-part of application No. PCT/CN2016/084582, filed on Jun. 2, 2016.

(51) Int. Cl.
*G06F 9/48* (2006.01)
*G06F 9/30* (2018.01)
(Continued)

(52) U.S. Cl.
CPC .......... *G06F 9/4825* (2013.01); *G06F 9/3005* (2013.01); *G06F 9/3836* (2013.01); *G06F 9/466* (2013.01); *G06F 9/48* (2013.01)

(58) Field of Classification Search
CPC .... G06F 9/4824; G06F 9/3005; G06F 9/3836; G06F 9/466; G06F 9/48
See application file for complete search history.

(56) References Cited

U.S. PATENT DOCUMENTS

| | | | |
|---|---|---|---|
| 6,421,702 B1 * | 7/2002 | Gulick | G06F 9/4812 712/225 |
| 7,979,686 B1 * | 7/2011 | Robles | G06F 9/4812 712/244 |

(Continued)

FOREIGN PATENT DOCUMENTS

| | | |
|---|---|---|
| CN | 1248016 | 3/2000 |
| CN | 102109839 | 6/2011 |
| CN | 104102491 | 10/2014 |

OTHER PUBLICATIONS

International Search Report and Written Opinion for International patent application No. PCT/CN2016/084582, dated Mar. 8, 2017, 11 pages.

*Primary Examiner* — Jacob D Dascomb
(74) *Attorney, Agent, or Firm* — Rankin, Hill & Clark LLP (57) ABSTRACT

Disclosed are a method, a device, and a single-tasking system for implementing multi-tasking in a single-tasking system. The method includes: performing a master task; allocating a hardware timer to a slave task on a central processing unit (CPU); configuring an interrupt period of the hardware timer; and generating, by the hardware timer, a hardware interrupt periodically based on the interrupt period to trigger the performance of the slave task. Therefore, independent and concurrent execution of the master task and slave task can be achieved in a single-tasking system, without the need to add an unwieldy multitasking scheduling framework to the operating system. Furthermore, the slave task is executed only when the hardware timer generates hardware interrupts, so less system resources will be consumed and the unwieldy inter-process communication mechanisms as adopted in traditional multi-tasking systems won't be needed. Example inter-process communication mechanisms may include, semaphores, spinlocks, etc.

9 Claims, 2 Drawing Sheets

(51) Int. Cl.
*G06F 9/38* (2018.01)
*G06F 9/46* (2006.01)

(56) References Cited

U.S. PATENT DOCUMENTS

2009/0222830 A1 9/2009 Liu
2010/0050184 A1* 2/2010 Lin .................... G06F 9/30043
718/107

* cited by examiner

METHOD, DEVICE, AND SINGLE-TASKING SYSTEM FOR IMPLEMENTING MULTI-TASKING IN SINGLE-TASKING SYSTEM

CROSS REFERENCE TO RELATED APPLICATIONS

This US patent application is a continuation-in-part of PCT patent application which is filed on Jun. 2, 2016 and is assigned with the PCT application number of PCT/CN2016/084582. The contents of the PCT application are incorporated herein by reference in its entirety.

TECHNICAL FIELD

This disclosure relates generally to computer technology, and more particularly to a method, a device, and a single-tasking system for implementing multi-tasking in a single-tasking system.

BACKGROUND

Multi-tasking is generally implemented in a multi-tasking system by an operating system in a centralized manner, but the multi-tasking system is run at the expense of relatively high scheduling overhead, large system resource consumption, and complicated concurrent management. Single-tasking systems are used on the occasions within their power, by virtue of simplicity, efficiency, small amount of system resource consumption, ease of management and maintenance, as well as low overall cost.

Thus, based on a dual consideration of cost and need, the single-tasking system can be utilized to achieve multi-tasking.

In the course of practicing this disclosure, however, the inventors have found that single-tasking systems provided by the prior art may have at least the following problems. The software architecture of the operating system of existing single-tasking systems only provides a single-tasking mechanism and framework, but no task-related management and services are provided, including, e.g., task start/termination, task switching, task scheduling, semaphores, or mutexes. So multi-tasking cannot be achieved with existing single-tasking systems.

SUMMARY

In view of this, embodiments of the disclosure provide a method, a device, and a single-tasking system for implementing multi-tasking in a single-tasking system to overcome the problem that the single-tasking systems provided by the prior art cannot achieve multitasking.

According to one aspect, a method of implementing multi-tasking in a single-tasking system comprises: performing a master task; allocating a hardware timer to a slave task on a central processing unit (CPU); configuring an interrupt period of the hardware timer; and generating, by the hardware timer, a hardware interrupt periodically based on the interrupt period to trigger the performance of the slave task.

The hardware timer may be a timer specifically assigned to the slave task, and the slave task may serve only one software module.

Generating by the hardware timer the hardware interrupt periodically based on the interrupt period to trigger the execution of the slave task may comprise: segmenting the slave task sequentially into multiple transaction running layers, and executing only one segmented step each time the hardware timer generates a hardware interrupt.

Segmenting the slave task sequentially into multiple transaction running layers and executing only one segmented step each time the hardware timer generates a hardware interrupt may comprise: segmenting running transactions of the slave task sequentially into multiple transaction running layers; assigning a global independent step count variable to each transaction running layer to record a next reentry running start point of a current transaction processing function of each transaction running layer; implementing the transaction processing functions of each transaction running layer whose maximum times of completion are each greater than a preset time-consuming threshold as reentrant stepped functions; adding a statement that resets a step count variable of the next transaction running layer to zero, a statement that assigns a value to the step count variable, as well as a statement label to a transaction processing function at each transaction running layer prior to calling stepped functions of the next transaction running layer, for locating an initial running position of the stepped functions of the next transaction running layer and a jump position of the current transaction processing function at the reentrancy to the current transaction processing function; adding a step jump branch-transfer statement to the beginning of code of the stepped functions of each transaction running layer; and exiting the stepped functions of each transaction running layer when a wait status has not yet been reached, to terminate the execution of the slave task.

Segmenting the slave task sequentially into multiple transaction running layers and executing only one segmented step each time the hardware timer generates a hardware interrupt may further comprise: controlling each stepped function to modify a count value of the step count variable of this stepped function as a non-zero value that is unique within this stepped function, when the stepped function exits from its own segmentation point; and controlling each stepped function to modify a count value of the step count variable of this stepped function as zero, when the stepped function is finished running.

Segmenting the slave task sequentially into multiple transaction running layers and executing only one segmented step each time the hardware timer generates a hardware interrupt may further comprise: each time a stepped function is called, determining whether the count value of the step count variable of the stepped function is a non-zero value, and if it is a non-zero value, exiting the current function.

According to another aspect, a device for implementing multi-tasking in a single-tasking system may comprise: a master-task execution module for performing a master task; a timer allocation module for allocating a hardware timer to a slave task on a central processing unit (CPU); an interrupt-period configuration module for configuring an interrupt period of the hardware timer; a slave-task execution module configured for triggering the performance of the slave task in response to the hardware timer's periodically generating a hardware interrupt based on the interrupt period.

The hardware timer may be a timer specifically assigned to the slave task, and the slave task may serve only one software module.

The slave-task execution module may comprise: a slave-task execution unit configured for sequentially segmenting the slave task into multiple transaction running layers, and executing only one segmented step each time the hardware timer generates a hardware interrupt.

The slave-task execution unit may comprise: a layer-segmentation sub-unit configured for sequentially segmenting the running transactions of the slave task into multiple transaction running layers; a step-count-variable allocation sub-unit configured for assigning a global independent step count variable for each transaction running layer to record a next reentry running start point of a current transaction processing function of each transaction running layer; a stepped-function generation sub-unit configured for implementing the transaction processing functions of each transaction running layer whose maximum times of completion are each greater than a preset time-consuming threshold as reentrant stepped functions; a positioning-processing sub-unit configured for adding a statement that resets a step count variable of the next transaction running layer to zero, a statement that assigns a value to the step count variable, as well as a statement label to a transaction processing function of each transaction running layer prior to calling stepped functions of the next transaction running layer, for locating an initial running position of the stepped functions of the next transaction running layer and a jump position of the current transaction processing function at the reentrancy to the current transaction processing function; a jump-processing sub-unit configured for adding a step jump branch-transfer statement to the beginning of code of the stepped functions of each transaction running layer; and a slave-task termination sub-unit configured for exiting the stepped functions of each transaction running layer when a wait status has not yet been reached, to terminate the performance of the slave task.

The slave-task execution unit may further comprise: a first step-count-variable modification module configured for controlling each stepped function to modify a count value of the step count variable of the stepped function as a non-zero value that is unique within this stepped function, when the stepped function exits from its own segmentation point; and a second step-count-variable modification module configured for controlling each stepped function to modify a count value of the step count variable of the stepped function as zero, when the stepped function is finished running.

The slave-task execution unit may further comprise: a step-count-variable determination module configured for determining whether the count value of the step count variable of a stepped function is a non-zero value each time the stepped function is called, and if it is a non-zero value, exiting the current function.

According to yet another aspect, a single-tasking system is further provided that comprises the above-described device for implementing multi-tasking in a single-tasking system.

Embodiments of the disclosure enable independent and concurrent execution and the master task and the slave task in a single-tasking system, without the need to add an unwieldy multitasking scheduling framework to the operating system. Furthermore, the slave task is executed only when the hardware timer generates hardware interrupts, so less system resources will be consumed and the unwieldy inter-process communication mechanisms as adopted in a traditional multi-tasking system will not be needed. Example inter-process communication mechanisms can include, e.g., semaphores, spinlocks, etc. Moreover, the slave task runs fast and occupies less system time so it won't block the CPU or other modules.

DETAILED DESCRIPTION OF ILLUSTRATED EMBODIMENTS

The present disclosure will now be described in further detail with reference to the accompanying drawings and embodiments, in which the objectives, technical solutions, and advantages of the disclosure will become more apparent from the following description. It will be understood that the specific embodiments described herein are merely illustrative of the disclosure and are not intended to limit the disclosure.

In various embodiments, after running the master task, a hardware timer may be allocated to a slave task and an interrupt period of the hardware timer may be configured, so that the hardware timer may periodically generate a hardware interrupt based on the hardware interrupt to trigger the performance of the slave task.

The implementation of the disclosure will now be described in greater detail in connection with specific embodiments.

Embodiment 1

Figure 1:
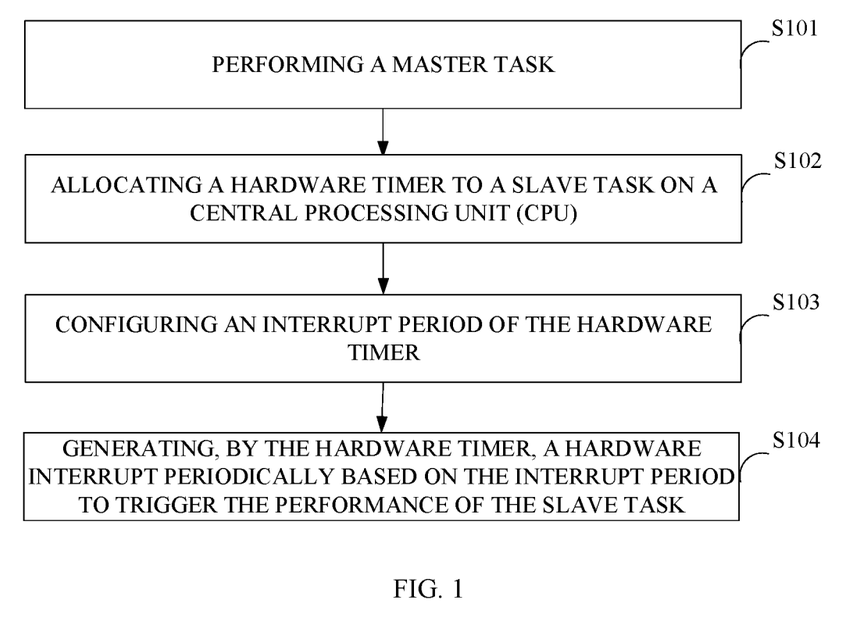
FIG. 1 is an illustrative flowchart of a method embodiment of implementing multi-tasking in a single-tasking system in accordance with the disclosure.

FIG. 1 is an illustrative flowchart of a method of implementing multi-tasking in a single-tasking system in accordance with embodiment 1 of the disclosure. The method may include the following process that begins at step S101.

In step S101, a master task is executed.

In this embodiment, the single-tasking system may need to process two tasks, one is a master task, while the other a slave task. The master task may never stop running; it may run an application program and manage the input and output of the whole system. The slave task may occasionally start for a period of time before being terminated. The method may then proceed to step S102.

In step S102, a hardware timer may be allocated to the slave task on a central processing unit (CPU).

When performing concurrent processing of two types of transactions in a single-tasking system kernel, the programming processes of the two types of transactions need to be modular; that is, their programming processes need to be independent of each other and cannot be intertwined, in order to facilitate the upgrade and maintenance.

In this embodiment, a hardware timer may be allocated on the CPU. The hardware timer is specifically assigned to the slave task, and the slave task may serve only one software module, so as to meet the modular requirement in the programming processes of two types of transactions in the single-tasking system, avoiding the interdependence or mutual influence resulting from the sharing with other modules. The method may then continue to step S103.

In step S103, an interrupt period of the hardware timer is configured.

In this embodiment, by configuring the interrupt period of the hardware timer, the hardware timer can periodically generate an interrupt to be initiated to the CPU, where the interrupt period may be set to 10 milliseconds. It is also possible to adjust the value of the interrupt period based on the operating speed of the CPU and the urgency of the task; for example, the interrupt period can be adjusted to 1 millisecond, 5 milliseconds, 50 milliseconds, 100 milliseconds, and so on. The configuration of the hardware timer can be performed using an associated API of the module to which the slave task belongs, such as a module activation API. The method may then proceed to step S104.

In step S104, the hardware timer periodically generates a hardware interrupt based on the interrupt period to trigger the performance of the slave task.

In this embodiment, when the timing of the hardware timer reaches the configured interrupt period, a hardware interrupt may be generated to trigger the performance of the slave task.

Specifically, the slave task can be sequentially segmented into multiple transaction running layers, and each time the hardware timer generates a hardware interrupt, only one segmented step may be executed, where each segmented step may occupy a thin "slice" of time with a maximum rating—e.g., it can be less than 500 nanoseconds.

Specifically, the slave task can be sequentially segmented into multiple transaction running layers, and only one segmented step may be executed each time the hardware timer generates a hardware interrupt by the following process which begins at step 1.

In step 1, running transactions of the slave task are sequentially segmented into multiple transaction running layers.

The running transactions of the slave task can be segmented sequentially into multiple transaction running layers, typically 3 layers. Of the three transaction running layers, the first layer is the main entry to the transactions, and may call relevant transaction processing functions of the second layer based on a current status; that is, the first layer may provide access to the second layer. The transaction processing functions of the second layer may process their own transactions, and may further call relevant transaction processing functions of the third layer.

For instance, transactions of a MODEM communications module may in turn manage the connection sub-transactions and data transceiving sub-transactions in the first layer, which may then call the connection sub-transaction functions and data transceiving sub-transaction functions. The connection and data transceiving sub-transaction functions are the transaction processing functions of the second layer, and their function bodies may call the processing functions of the third layer for directly reading and writing to the MODEM chip.

In step 2, a global independent step count variable is assigned to each transaction running layer to record a next reentry running start point of a current transaction processing function of each transaction running layer.

In step 3, the transaction processing functions in each transaction running layer whose maximum times of completion are each greater than a preset time-consuming threshold are implemented as reentrant stepped functions.

Among the transaction processing functions of each transaction running layer, the transaction processing functions with relatively longer maximum times of completion each of which is greater than the preset time-consuming threshold (e.g., 1 millisecond) can be designed and implemented as reentrant stepped running functions (hereinafter stepped functions), so as to ensure a relatively shorter running time of each step (e.g., less than 500 nanoseconds). The requirement for reentrancy follows: an variable, one access of which will not affect the next run can be defined as a local automatic variable, while an variable one access of which will affect or accumulate to the next run can be defined as a local static variable. A function that can be completed at one visit over a very short span of time needs not be implemented as a stepped function.

In step 4, a statement that resets a step count variable of the next transaction running layer to zero, a statement that assigns a value to the step count variable, as well as a statement label are altogether added to a transaction processing function of each transaction running layer prior to calling stepped functions of the next transaction running layer, for locating an initial running position of the stepped functions of the next transaction running layer as well as a jump position of the current transaction processing function at the reentrancy to the current transaction processing function.

To ensure simplicity and ease of control, the label header may be "STEP_" while the label tail may be a number (e.g., STEP_1), where the number is the same as the current count of the count value.

For example, in a transaction processing function at the MODEM's first layer:

```
    ...
    task_s1=0;// to initialize the step count for the subsequent next-layer function
    task_s0=2;// to assign the current step position value to the step count variable task_s0 of the current layer
    STEP_2: // jump label
    a=step_modem_connect( );// it will use task_s1 to control its own stepped running
```

In step 5, a step jump branch-transfer statement is added to the beginning of code of the stepped functions of each transaction running layer.

At the beginning of the stepped functions of each transaction running layer, a step jump branch-transfer statement may be added, which is an important link for achieving stepped running, while non-stepped functions won't need such processing.

For example, in a transaction processing function at the MODEM's first layer:

```
int task_s0=0,task_s1=0,task_s2=0;
int interrupt_modem_task(void)
{
int a;
  switch(task_s0)
  {
  case 0:goto STEP_0;
        case 1:goto STEP_1;
        case 2:goto STEP_2;
        ...
    }
    STEP_0:// jump label
    return 0;// no transaction, exit the interrupting function
    STEP_1: // jump label
    task_s1=0;// to initialize the step count for the subsequent next-layer function
        task_s0=2;// to assign the current step position value to the step count variable task_s0 of the current layer
    STEP_2: // jump label
    a=step_modem_connect( );// it will use task_s1 to control its own stepped running
        ...
}
```

In step 6, when a wait status has not yet been reached, the stepped functions of each transaction running layer may be exited to terminate the execution of the slave task.

If the running transactions are segmented into three transaction running layers, then the transaction running layer at the bottom would be the third transaction running layer obtained through the segmentation. For the stepped functions at the bottom transaction running layer, the current stepped function may typically be exited when the wait status has not yet reached; that is, the current interrupt service or the performance of the slave task will be terminated. This exit point is also the segmentation point, which ensures the whole task to run in a segmented manner, where each running may take up an extremely small amount of CPU time, allowing the CPU to handle other transactions with ease, effectively supporting the real-time nature of the embedded system. As the step count variable of every layer altogether records the breakpoint of the current running, when the next interrupt occurs, the breakpoint of the current running can be jumped to through three jumps for continued running. The variables to be memorized should be configured in the form of local static variables. According to the needs of transaction processing, the segmentation points can also be deployed in other layers.

For example, in a transaction processing function at the MODEM's third layer:

```
    int step_modem_io(char *in_cmd, char *out_response)
        // *in_cmd is the input command string, while *out_response is the output response string
        {
        int a;
            static int i;// used to receive the cumulative count of string, in the form of a static variable to enable memory function at the reentrancy
            switch(task_s2)//// jump header
            {
            ...
            case 2:goto STEP_2;
            ...
            }
            i=0;
            while(1)
            {
                task_s2=2;// to assign the current step position value to the step count variable task_s2 of the current layer
        STEP_2:
                    a=port_rx( out_response+i);// read a byte of MODEM response data from the MODEM port
                    if(a)// no response data
                    {
                    return 0; // no waiting, exit immediately
                    }
                    i ++; // the number of characters is incremented by one
                    //-- the following is timeout processing and exit processing
                    ...
            }// receiving loop
            ...
            task_s2=2;// finally reset the step count variable task_s2 to zero
            return 0;
        }
```

Exemplarily, in order to accurately control the performance of the slave task, and segment the slave task sequentially into multiple transaction running layers and execute only one segmented step each time the hardware timer generates a hardware interrupt, the method may further comprise the following steps.

In step 11, each stepped function is controlled to modify a count value of the step count variable of the stepped function as a non-zero value that is unique within this stepped function, when the stepped function exits from its own segmentation point, so as to indicate the transaction has not yet been completed, and also to ensure that the next running can be continued from the current segmentation point.

In step 12, each stepped function is controlled to modify a count value of the step count variable of the stepped function as zero, when the stepped function is finished running.

Exemplarily, in order to segment the slave task sequentially into multiple transaction running layers and execute only one segmented step each time the hardware timer generates a hardware interrupt, the method may further comprise the following step: each time a stepped function is called, determining whether the count value of the step count variable of this stepped function is a non-zero value, and if it is a non-zero value which indicates the transaction of this stepped function has not yet been completed, exiting the current function.

For example, in a transaction processing function at the MODEM's first layer:

```
int interrupt_modem_task(void)
{
int a;
        ...
        STEP_2:
```

-continued

```
            a=step_modem_connect( );
            if(task_s1)return 0;
            if(a)// the connection process ends but fails
            {
              HangOff( ); // hang up the line
                return 1000+a;
            }
            //--the following starts processing transactions after a
                successful connection
                ...
}
```

Through the above processing, when the set time interval of the timer has been reached, the first transaction running layer may be first entered to jump to a step breakpoint of the first transaction running layer. Then a transaction processing function of the second transaction running layer may be called and entered to jump to the step breakpoint of this function. Further, a stepped function of the third transaction running layer may be called and entered to jump to the step breakpoint of this function, and determination is performed as to whether the wait status has been reached. If the wait status has not yet been reached, then the process may in turn exit the stepped functions of the third transaction running layer, the stepped functions of the second transaction running layer, and the stepped functions of the first transaction running layer; otherwise the processing of the subsequent transactions will be continued.

In addition, it should be noted that the management of the slave task is carried out by system API functions, the management usually including starting, data transmission, data reception, status query, status control, closing, and other operations. The system API functions implement the management of the slave task mainly through manipulating all the variables of the slave task. The APIs' management over the slave task is achieved mainly through accessing the global variables associated with the slave task. In order to prevent competition and process abnormalities, the hardware timer interrupt generation should be turned off at the moment of accessing, and may then be turned on after the accessing is completed.

In this embodiment, after running the master task, a hardware timer may be allocated to a slave task and an interrupt period of the hardware timer may be configured, so that the hardware timer may periodically generate a hardware interrupt based on the hardware interrupt to trigger the performance of the slave task. Therefore, independent and concurrent execution of the master task and the slave task is achieved in a single-tasking system, without the need to add an unwieldy multitasking scheduling framework to the operating system. Furthermore, the slave task is executed only when the hardware timer generates hardware interrupts, so less system resources will be consumed and the unwieldy inter-process communication mechanisms adopted in a traditional multi-tasking system will be not be needed. Example inter-process communication mechanisms can include, e.g., semaphores, spinlocks, etc. Moreover, the slave task runs fast and occupies less system time so it won't block the CPU or other modules.

In addition, the hardware timer is specifically assigned to the slave task, and the slave task may serve only one software module, so as to meet the modular requirement in the programming processes of two types of transactions in a single-tasking system, avoiding the interdependence or mutual influence resulting from the sharing with other modules, thus facilitating the system upgrade and maintenance.

In addition, some functions are sensibly implemented as functions that can be continually reentrant and can run in a stepped manner, so that a logically coherent transaction can be completed in steps. Intervals between steps can be yielded for the CPU to perform other transactions. A peripheral module may have such characteristics that the data throughput times are very short, while a large amount of time is elapsed in waiting. Such segmentation and stepped processing just fit the characteristics of the peripheral module.

It will be appreciated that throughout the various embodiments of the disclosure, the sequence numbers recited in the above processes are not intended as implying an order of execution. Instead, the execution order of various processes should be determined based on their functions and intrinsic logics. Thus, these sequence numbers recited will not constitute any limitation to the implementation of the embodiments of the disclosure.

It will be understood by those of ordinary skill in the art that some or all steps of the various embodiments described supra can be performed by instructing the relevant hardware via program(s). The corresponding program(s) can be stored in a computer-readable storage medium, e.g., ROMs/RAMs, magnetic disks, optical discs, or the like.

Embodiment 2

Figure 2:
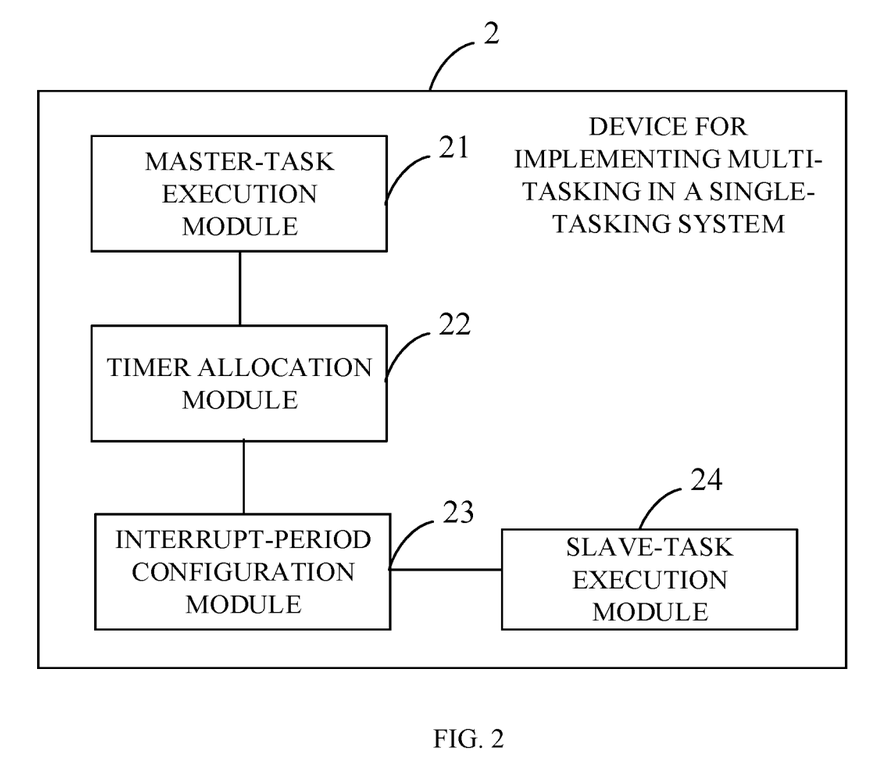
FIG. 2 is an illustrative block diagram of a device embodiment for implementing multi-tasking in a single-tasking system in accordance with the disclosure.

FIG. 2 shows an illustrative block diagram of a device for implementing multi-tasking in a single-tasking system in accordance with embodiment 2 of the disclosure, where only the parts that are relevant to this embodiment are shown in the figure, for purposes of illustration. The device 2 for implementing multi-tasking in a single-tasking system can be software units, hardware units, or a combination of hardware and software units built into the single-tasking system. The device 2 for implementing multi-tasking in a single-tasking system may comprise a master-task execution module 21, a timer allocation module 22, an interrupt-period configuration module 23, and a slave-task execution module 24.

The master-task execution module 21 is configured for performing a master task.

The timer allocation module 22 is configured for allocating a hardware timer to a slave task on a central processing unit (CPU).

The interrupt-period configuration module 23 is configured for configuring an interrupt period of the hardware timer.

The slave-task execution module 24 is configured for triggering the performance of the slave task in response to the hardware timer's periodically generating a hardware interrupt based on the interrupt period.

The hardware timer may be a timer specifically assigned to the slave task, and the slave task may serve only one software module.

In particular, the slave-task execution module 24 may comprise: a slave-task execution unit configured for sequentially segmenting the slave task into multiple transaction running layers, and executing only one segmented step each time the hardware timer generates a hardware interrupt.

In particular, the slave-task execution unit may comprise: a layer-segmentation sub-unit configured for sequentially segmenting the running transactions of the slave task into multiple transaction running layers; a step-count-variable allocation sub-unit configured for assigning a global independent step count variable to each transaction running layer to record a next reentry running start point of a current transaction processing function of each transaction running layer; a stepped-function generation sub-unit configured for implementing the transaction processing functions of each transaction running layer whose maximum times of completion are each greater than a preset time-consuming threshold as reentrant stepped functions; a positioning-processing sub-unit configured for adding a statement that resets a step count variable of the next transaction running layer to zero, a statement that assigns a value to the step count variable, as well as a statement label altogether to a transaction processing function of each transaction running layer prior to calling the stepped functions of the next transaction running layer, for locating an initial running position of the stepped functions of the next transaction running layer and a jump position of the current transaction processing function at the reentrancy to the current transaction processing function; a jump-processing sub-unit configured for adding a step jump branch-transfer statement to the beginning of code of the stepped functions of each transaction running layer; and a slave task termination sub-unit configured for exiting the stepped functions of each transaction running layer when a wait status has not yet been reached, to terminate the performance of the slave task.

The slave-task execution unit may further comprise: a first step-count-variable modification module configured for controlling each stepped function to modify a count value of the step count variable of the stepped function as a non-zero value that is unique within this stepped function, when the stepped function exits from its own segmentation point; and a second step-count-variable modification module configured for controlling each stepped function to modify a count value of the step count variable of the stepped function as zero, when the stepped function is finished running.

The slave-task execution unit may further comprise: a step-count-variable determination module configured for determining whether the count value of the step count variable of a stepped function is a non-zero value each time the stepped function is called, and if it is a non-zero value, exiting the current function.

The device for implementing multi-tasking in a single-tasking system according to this embodiment can be applied to corresponding embodiment 1 described supra; for more details, see the description of the above embodiment 1, so they are not to be detailed again.

Those of ordinary skill in the art will appreciate that the various example units and algorithmic steps described in connection with the embodiments disclosed herein can be implemented by electronic hardware, or by combination of computer software and electronic hardware. Whether these functions are implemented in hardware or software depends on the specific application and design constraints of the technical solution. Those of skill in the art can use a different method for each particular application to implement the described function, where these implementations, however, shall not be considered beyond the scope of the disclosure.

It will be apparent to those skilled in the art that for the convenience and simplicity of the description, the corresponding processes of the method embodiment described earlier on can be referred to for the specific operating processes of the above system, device, and units, which so won't be detailed again.

It should be understood that the systems, device, and method disclosed in several embodiments provided herein may also be implemented in other ways. For example, the device embodiment described is merely illustrative. For example, the division of units is merely a division by logical functions, so there may exist other ways of division in actual implementations, e.g., multiple units or components may be combined or be integrated into another system, or some features can be omitted, or not performed. In another aspect, the couplings, direct couplings, or communication connections shown or discussed may be indirect couplings or communication connections through some interfaces, devices or units, and may be electrical, mechanical, or in other forms.

Separate units as illustrated may or may not be physically separate. Components or parts illustrated as units may or may not be physical units, and may reside at one location or may be distributed over multiple networked units. Some or all of the units may be selectively adopted according to actual requirements to achieve objectives of embodiments of the disclosure.

Various functional units described in various embodiments herein may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portions that contribute to the prior art, or part of the technical solution, of the disclosure may be embodied as software products. Computer software products can be stored in a storage medium and can include multiple instructions that, when executed, cause a computing device, e.g., a personal computer, a server, a network device, etc., to execute some or all steps of the methods as described in various embodiments. The above storage medium may include various kinds of media that can store program code, such as a USB flash disk, a mobile hard drive, a read-only memory (ROM), a random access memory (RAM), a magnetic disk, an optical disc, or the like.

Furthermore, it will be apparent to those skilled in the art that this disclosure also provides a device for implementing multi-tasking in a single-tasking system, as well as a single-tasking system comprising this device, the device comprising a non-transitory program storage medium and one or more processors. The non-transitory program storage medium stores program code executable by the one or more processors to perform the methods described supra. In addition, it will be apparent to those skilled in the art that various units or modules 21, 22, 23, and 24 as illustrated in FIG. 2 can be software modules or software units. In another aspect, it is well-known that various software modules or software units inherently can be stored in the non-transitory program storage medium and executed by the one or more processors.

The foregoing description merely depicts some particular embodiments, but the scope of this disclosure won't be limited thereto, and any person skilled in the art will be able to readily think of a variety of variations or substitutions without departing from the technical scope of the disclosure, where all such variations or substitutions shall be compassed within the scope of the disclosure. Therefore, the scope of protection of the disclosure is only defined by the appended claims.

What is claimed is:

1. In a single-tasking system comprising a central processing unit and a non-transitory program storage medium storing program codes in the form of software modules and executable by the central processing unit, a method of implementing multi-tasking in a single-tasking system:
comprising:
performing a master task;
allocating a hardware timer to a slave task on the central processing unit;
configuring an interrupt period of the hardware timer; and
generating, by the hardware timer, a hardware interrupt periodically based on the interrupt period to trigger the performance of the slave task;
wherein generating, by the hardware timer, the hardware interrupt periodically based on the interrupt period to trigger the performatnce of the slave task comprises:
segmenting the slave task sequentially into a plurality of transaction running layers, and only executing a respective one of the plurality of transation running layers each time the hardware timer generates the hardware interrupt;

wherein segmenting the slave task sequentially into the plurality of transaction running layers and only executing a respective one of the plurality of transaction running layers each time the hardware timer generates the hardware interrupt, comprises:
segmenting running transactions of the slave task sequentially into a plurality of transacton running layers;
assigning a global independent step count variable to each transacton running layer to record a next reentry running start point of a current transaction processing function of each transaction running layer;
implementing the transaction processing functions of each transaction running layer whose maximum times of completion are each greater than a preset time-consuming threshold as reentrant stepped functions;
adding a statement that resets a step count variable of the next transaction running layer to zero, a statement that assigns a value to the step count variable, as well as a statement label to the transaction processing function of each transaction running layer prior to calling the stepped functions of the next transaction running layer, for locating an initial running position of the stepped functions of the next transaction running layer and a jump position of the current transaction processing function at the reentrancy to the current transaction processing function;
adding a step jump branch-transfer statement to the beginning of code of the stepped functions of each transaction running layer; and
exiting the stepped functions of each transaction running layer when a wait status has not yet been reached, to terminate the execution of the slave task.

2. The method of claim 1, wherein the hardware timer is a timer specifically assigned to the slave task, and the slave task serves only one software module.

3. The method of claim 1, wherein segmenting the slave task sequentially into the plurality of transaction running layers and only executing a respective one of the plurality of transaction running layers each time the hardware timer generates the hardware interrupt further comprises:
controlling each stepped function to modify a count value of the step count variable of the stepped function as a non-zero value that is unique within this stepped function, when the stepped function exits from its own segmentation point; and
controlling each stepped function to modify the count value of the step count variable of the stepped function as zero, when the stepped function is finished running.

4. The method of claim 1, wherein segmenting the slave task sequentially into the plurality of transaction running layers and only executing a respective one of the plurality of transaction running layers each time the hardware timer generates the hardware interrupt further comprises:
determining whether a count value of the step count variable of the stepped function is a non-zero value each time a stepped function is called, and exiting the current function if it is a non-zero value.

5. A device for implementing multi-tasking in a single-tasking system, comprising a non-transitory program storage medium storing program codes in the form of software modules and a central processing unit being configured to execute the software modules stored in the non-transitory program storage medium, wherein the program codes comprise:
a master-task execution module configured to perform a master task;
a timer allocation module configured to allocate a hardware timer to a slave task on the central processing unit;
an interrupt-period configuration module configured to configure an interrupt period of the hardware timer; and
a slave-task execution module configured to trigger the performance of the slave task in response to the hardware timer's periodically generating a hardware interrupt based on the interrupt period;
wherein the slave-task execution module comprises:
a slave-task execution unit configured to segment the slave task sequentially into a plurality of transaction running layers, and only execute a respective one of the plurality of transaction running layers each time the hardware timer generates the hardware interrupt;
the slave-task execution unit comprises:
a layer-segmentation sub-unit configured to segment running transaction of the slave task sequentially into a plurality of transaction running layers;
a step-count-variable allocation sub-unit configured to assign a global independent step count variable to each transaction running layer to record a next reentry running start point of a current transaction processing function of each transaction running layer;
a stepped-function generation sub-unit configured to implement the transaction processing functions of each transaction running layer whose maximum times of completion are each greater than a preset time-consuming threshold as reentrant stepped functions;
a positioning-processing sub-unit configured to add a statement that resets a step count variable of the next transaction running layer to zero, a statement that assigns a value to the step count variable, as well as a statement label to a transaction processing function of each transaction running layer prior to calling the stepped functions of the next transaction running layer, for locating an initial running position of the stepped functions of the next transaction running layer and a jump position of the current transaction processing function at the reentrancy to the current transaction processing function;
a jump-processing sub-unit configured to add a step jump branch-transfer statement to the beginning of code of the stepped functions of each transaction running layer; and
a slave-task termination sub-unit configured to exit the stepped functions of each transaction running layer when a wait status has not yet been reached, to terminate the performance of the slave task.

6. The device of claim 5, wherein the hardware timer is a timer specifically assigned to the slave task, and the slave task serves only one software module.

7. The device of claim 5, wherein the slave-task execution unit further comprises:
a first step-count-variable modification module configured to control each stepped function to modify a count value of the step count variable of the stepped function as a non-zero value that is unique within this stepped function, when the stepped function exits from its own segmentation point; and
a second step-count-variable modification module configured to control each stepped function to modify a count value of the step count variable of the stepped function as zero, when the stepped function is finished running.

8. The device of claim 5, wherein the slave-task execution unit further comprises:
a step-count-variable determination module configured to determine whether the count value of the step count variable of a stepped function is a non-zero value each time the stepped function is called, and exiting the current function if it is a non-zero value.

9. A single-tasking system comprising the device for implementing multi-tasking in a single-tasking system according to claim 5.

\* \* \* \* \*